United States Patent [19]

Dreyer

[11] Patent Number: 5,191,316

[45] Date of Patent: Mar. 2, 1993

[54] APPARATUS FOR DETERMINING AND/OR MONITORING A PREDETERMINED CONTENTS LEVEL IN A CONTAINER

[75] Inventor: Volker Dreyer, Lörrach-Haagen, Fed. Rep. of Germany

[73] Assignee: Endress u. Hauser GmbH u. Co., Fed. Rep. of Germany

[21] Appl. No.: 700,134

[22] PCT Filed: Sep. 19, 1990

[86] PCT No.: PCT/DE90/00718

§ 371 Date: May 20, 1991

§ 102(e) Date: May 20, 1991

[87] PCT Pub. No.: WO91/04467

PCT Pub. Date: Apr. 4, 1991

[30] Foreign Application Priority Data

Sep. 21, 1989 [DE] Fed. Rep. of Germany ....... 3931453

[51] Int. Cl.[5] .............................................. G08B 21/00
[52] U.S. Cl. ..................................... 340/621; 340/620; 73/290 V; 310/323; 310/328
[58] Field of Search .............. 340/618, 621, 612, 615, 340/620; 73/290 V; 310/317, 323, 324, 325, 328

[56] References Cited

U.S. PATENT DOCUMENTS

| | | | |
|---|---|---|---|
| 3,396,285 | 8/1968 | Minchenko | 310/625 |
| 3,625,058 | 12/1971 | Endress et al. | 73/290 V |
| 3,944,994 | 3/1976 | Fanshawe | 340/621 X |
| 4,507,583 | 3/1985 | Jensen et al. | 340/621 X |
| 4,594,584 | 6/1986 | Pfeiffer et al. | 340/620 |

FOREIGN PATENT DOCUMENTS 3402418  8/1984  Fed. Rep. of Germany .
3623741  1/1988  Fed. Rep. of Germany .

*Primary Examiner*—Jin F. Ng
*Assistant Examiner*—Jeffery A. Hofsass
*Attorney, Agent, or Firm*—Barnes & Thornburg

[57] ABSTRACT

The apparatus comprises at least two oscillating rods which are secured spaced from each other to a diaphragm, the edge of which is connected to a screw-in piece. On the side of the diaphragm remote from the oscillating rods a clamping screw is fixedly connected to the diaphragm so that the clamping screw and diaphragm assume a position with respect to each other in which the axes of symmetry coincide. The clamping screw is surrounded by a stack of annular piezoelectric elements, electrode rings and insulating rings. The stack forms the excitation and receiving transducer of the apparatus. The stack-shaped excitation and receiving transducer is clamped and secured between the diaphragm and a hexagonal nut. The stack bears on pressure studs which are arranged between a metal ring terminating the stack and the diaphragm. The clamping force is chosen so that the diaphragm is simultaneously concavely prestressed. The excitation transducer stimulates the oscillating rods to oppositely directed oscillations at their natural resonant frequency transversely of their longitudinal axes. The receiving transducer detects a change of the oscillation behavior of the oscillating rods and this is utilized to determine and/or monitor the predetermined level. Both the change of the oscillating frequency and that of the oscillating amplitude of the oscillating rods may be utilized.

14 Claims, 2 Drawing Sheets

APPARATUS FOR DETERMINING AND/OR MONITORING A PREDETERMINED CONTENTS LEVEL IN A CONTAINER

The invention relates to an apparatus for determining and/or monitoring a predetermined contents level in a container, comprising a mechanical oscillation structure having at least two oscillating rods projecting into the container and mounted spaced from each other on a diaphragm clamped at the edge, an excitation arrangement which sets the oscillating rods in opposite oscillations transversely of their longitudinal direction and includes an excitation transducer having at least one piezoelectric element excitable by an ac voltage, and a receiving transducer having at least one piezoelectric element which transforms the oscillations of the mechanical oscillation structure to an electrical output signal.

An apparatus of this type is known from DE-AS 1,773,815. Compared with other known apparatuses having a single oscillating or vibrating rod projecting into the container it has the advantage that the alternating forces exerted by each oscillating rod on the clamping of the diaphragm cancel each other out due to the opposite sense of the oscillations and consequently no oscillation energy is lost by transmission to the container wall and the clamping is also subjected to less mechanical stress. In this known apparatus, the ends of the oscillating rods connected to the diaphragm are connected to each other by two bridges mechanically decoupled from each other, each of which consists of a yoke bearing on the diaphragm and a stirrup member spanning the yoke. The one bridge is coupled to the excitation transducer and the other bridge to the receiving transducer so that the piezoelectric element of the transducer is clamped between the stirrup member and the yoke. The excitation transducer is connected to the output of an amplifier, the input of which is connected to the receiving transducer so that a self-excitation of oscillations takes place with the natural resonant frequency of the mechanical oscillation structure.

The evaluating circuit connected to the output of the amplifier is configured to respond to amplitude changes. The mode of operation of this apparatus is based on the fact that the mechanical vibrations or oscillations of the oscillating rods are dampened on immersion into the contents material so that a reduction of the oscillation amplitude results which is detected by the evaluating circuit and effects the initiation of an indicating and/or switching operation.

It has been found that due to the configuration of the mechanical oscillation structure and the arrangement of the piezoelectric transducers, this known apparatus requires a relatively strong damping of the oscillating rods by the contents material to ensure a reliable response to the amplitude changes. This apparatus can therefore be used to monitor contents materials which when they cover the oscillating rods result in pronounced damping, such as bulk goods or fluids of high viscosity.

Another apparatus of the same type having two oscillating rods projecting into the container is known from German patent 3,336,991. The subject of this patent has a bridge which is arranged on the side of the diaphragm remote from the oscillating rods and which is held spaced from the diaphragm by flexurally elastic rod-shaped supports connected at the respective ends rigidly to the oscillating rod. In this known apparatus the piezoelectric elements of the excitation transducer and of the receiving transducer are arranged in a stack which is clamped with convex prestressing of the diaphragm between the bridge and the portion of the diaphragm lying between the oscillating rods. The subject of German patent 3,336,991 already solves the problem of further developing an apparatus of this type having two oscillating rods projecting into the container so that it is suitable for contents material of any desired type and can be operated with a low excitation ac voltage and low excitation energy.

Proceeding from this apparatus, the present invention is based on the problem of providing an apparatus for determining and/or monitoring a predetermined contents level in a container and having at least two oscillating rods projecting into the container, which can likewise be operated with a low excitation ac voltage and low excitation energy but which comprises a simplified excitation and receiving transducer consisting of few parts and is thus simpler and more economical to make.

The problem is solved by the features characterized in the claims.

The apparatus according to the invention has in addition the further advantage that the moments originating from the change of length of the piezoelectric elements and acting on the diaphragm are increased and thereby effect an increase of the oscillation amplitude of the oscillating rods.

An advantageous embodiment and further development of the invention is characterized in the subsidiary claims.

Further advantages and features of the invention will be apparent from the following description of an example of embodiment which is illustrated in the drawings, wherein.

Figure 1:
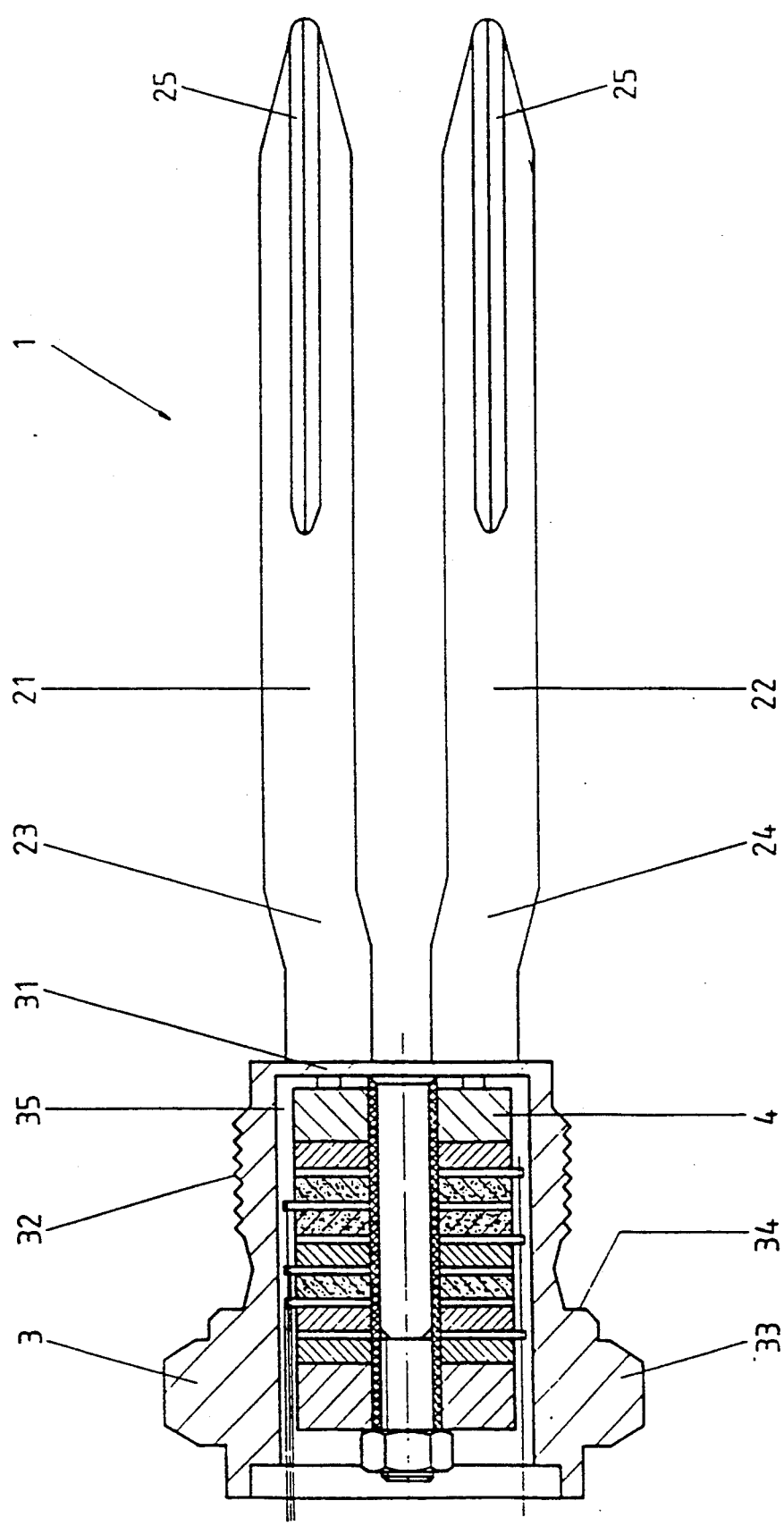
FIG. 1 is a partial longitudinal section through the apparatus according to the invention.

In FIG. 1, reference numeral 1 denotes an apparatus for determining and/or monitoring a predetermined level. It consists of the oscillating rods 21, 22, the screw-in piece 3 and the excitation and receiving transducer 4. The oscillating rods 21, 22 project into the interior of a container which is not illustrated and the contents level of which is to be determined or monitored by means of the apparatus 1. They are of the same shape and merely arranged turned through 180° with respect to each other about their longitudinal axis. The two oscillating rods are fixedly connected on the side remote from the container interior to the diaphragm 31 which seals the interior of the screw-piece 3 towards the container interior. Each of the oscillating rods 21, 22 is provided with a bend 23, 24 so that the major portions of the oscillating rods lying substantially parallel to each other are spaced a greater distance apart than the ends connected to the diaphragm. The effect of the bends 23, 24 is that residues of longitudinal oscillations also transmitted by the diaphragm 31 are likewise converted to oscillations directed transversely of the oscillating rods. The major portions of the oscillating rods have a round cross-section and are pointed at the free ends. The bent portions 23, 24 widen to a larger unround cross-section at the connection point with the diaphragm 31.

At the free end of each oscillating rod 21, 22 a paddle 25 is attached perpendicularly to the plane containing the axes of the oscillating rods. Each of the paddles 25 extends from the free end of the oscillating rod over a relatively large length which may be between 40 and 60% of the length of the oscillating rods and is preferably about 50% of said length. On the other hand, the width of each paddle perpendicular to the longitudinal axis of the oscillating rod is substantially smaller than the length extent. Said width of the paddles 25 and the bends 23, 24 are adapted to each other so that the oscillating rods 21, 22 with the paddles 25 mounted thereon can be passed through an opening which is formed in the container wall, not illustrated. In spite of the correspondingly necessary relatively small width of the paddles 25, due to the large length extent of the paddles a large effective paddle area is obtained.

The screw-in piece 3 is of cylindrical form and has a cylindrical outer thread 32 with which the apparatus 1 is mounted in the wall, not illustrated, of the container of which the filling level is to be determined and/or monitored with the apparatus. For this purpose, a bore traverses the container wall and is provided with a cylindrical inner thread. For screwing the apparatus 1 into the container wall a hexagon 33 is integrally formed on the screw-in piece 3 and the face spacing thereof corresponds to the key width of a spanner. The pressure-tight sealing is ensured by an annular sealing surface 34 and furthermore by interposing an annular seal, not illustrated, between said sealing surface and the container wall. The interior of the screw-in piece 3 is traversed on the side remote from the oscillating rods 21, 22 by a cylindrical cavity 35, the axial extent of which is chosen so that only a small remainder of the screw-in piece 3 is not traversed and forms the diaphragm 31 of the apparatus 1. The excitation and receiving transducer 4 is accommodated in the cylindrical cavity 35 of the screw-in piece 3.

Preferably, the oscillating rods 21, 22, the paddles 25, the screw-in piece 3 and the diaphragm 31 are made as integral metal shaped part.

Of course, the apparatus 1 may be installed at any desired point of the container. For example, this may be done in the wall or in the cover, depending on the manner in which the measuring and/or monitoring of the level is to take place.

Figure 2:
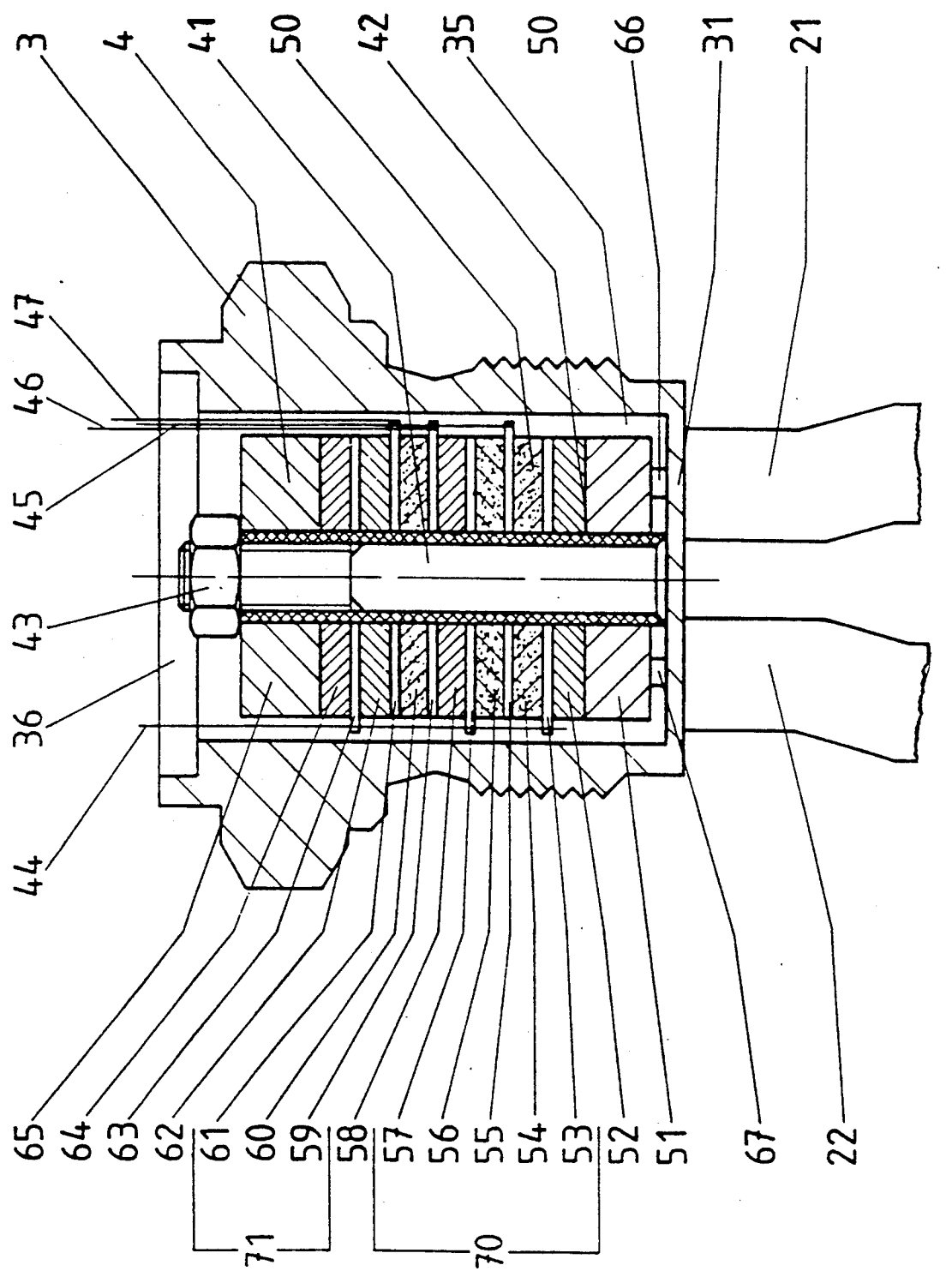
FIG. 2 is an enlarged longitudinal section through the screw-in piece of the apparatus according to the invention as shown in FIG. 1.

The structure of the excitation and receiving transducer 4 is shown in FIG. 2. It comprises a clamping screw 41 which is fixedly connected to the diaphragm 31. This can be done in any manner known to the person skilled in the art, such as welding, adhering, etc. The clamping screw 41 may however also be part of the integral metal shaped part of which the screw-in piece 3 including the oscillating rods 21, 22 is preferably made up.

The clamping screw 41 is disposed on the diaphragm 31 in such a manner that its axis of symmetry coincides with that of the diaphragm 31 and projects into the cylindrical cavity 35. Furthermore, the excitation and receiving transducer 4 comprises the insulating tube 42, the hexagonal nut 43, the connecting lines 44, 45, 46, 47 and the piezo stack 50 having the following components:

metal ring 51
insulating ring 52
electrode ring 53
annular piezoelectric element 54
electrode ring 55
annular piezoelectric element 56
electrode ring 57
insulating ring 58
electrode ring 59
annular piezoelectric element 60
electrode ring 61
insulating ring 62
electrode ring 63
insulating ring 64
metal ring 65.

The electrode rings 53, 55 and 57 and the annular piezoelectric elements 54 and 56 form therein the excitation transducer 70 and the electrode rings 59 and 61 together with the piezoelectric element 60 form the receiving transducer 71 of the excitation and receiving transducer 4. The insulating tube 42 forms the electrical insulation of the clamping screw 41 with respect to the components of the piezo stack 50.

In the example illustrated, all the parts of the piezo stack preferably have the same annular cross-section so that the transducer column is cylindrical and is guided by the clamping screw 41.

A soldering lug projecting out of the piezo stack 50 is also integrally formed on each electrode. The metal rings 51 and 65 consist preferably of brass and serve on the one hand as spacers for obtaining the necessary length of the piezo stack 50 between the diaphragm 31 and the hexagonal nut 43 and on the other hand to transmit the forces to the remaining components of the stack. In particular, the task of the metal rings 51, 65 is to transmit the area pressure generated by the hexagonal nut in parallel to the piezo-electric elements 54, 56, 60 and thus avoid any bending of the piezoelectric elements, which are very liable to fracture. The metal ring 51 ensures that the bendings of the diaphragm 31 originating from the pretensioning and the oscillations are not transmitted to the piezoelectric elements 54, 56, 60. This measure also prevents any flexural stress on the fragile piezoelectric elements. The pressure studs 66, 67 integrally formed on the metal ring 1 serve to transmit the changes in length of the piezoelectric elements 54, 56 originating from the excitation transducer 70 to the diaphragm 31. The pressure studs 66, 67 are arranged symmetrically opposite each other on a circular ring assuming a position coaxial with respect to the axis of symmetry of the diaphragm 31. The diameter of the circular ring is chosen so that the axis of symmetry of the pressure studs 66, 67 coincides with the axis of symmetry of the oscillating rods 21, 22.

Since the pressure studs 66, 67 arranged between the diaphragm 31 and metal ring 51 effect that the metal ring 51 and thus the piezo stack 50 always bear uniformly on the diaphragm, it is also possible according to the invention to form further pressure studs on the metal ring 51. They must then be arranged on the circular ring in such a manner that all the pressure studs are the same distance apart from each other. This makes it possible to arrange on the diaphragm 31 in addition to the oscillating rods 21, 22 illustrated further oscillating rods, the axis of symmetry of which must then likewise coincide with the axis of symmetry of the pressure studs. This could become necessary when the apparatus 1 is to be used to determine and/or monitor levels of liquids of very low viscosity.

According to an advantageous embodiment the metal ring 51 may form a single component together with the studs 66 and 67. It is however also possible to make the pressure studs 66, 67 integral with the diaphragm 31.

Alternatively, the studs 66, 67 may be made as individual parts and joined to the diaphragm 31 or the metal ring 51 by welding, adhesion or any other joining technique known to the person skilled in the art.

An electronic head, not illustrated, is arranged on the screw-in piece 3 in axial extension thereof on the side remote from the oscillating rods 21, 22. Said head contains the electronic circuit of the apparatus 1. It is surrounded by a housing. The cylindrical recess 36 extending axially somewhat on the side remote from the oscillating rods and having a larger diameter than the cavity 35 serves to accommodate the electronic head housing. The electronic circuit, not illustrated, is connected electrically to the excitation and receiving transducer 4 via the connecting lines 44, 45, 46, 47.

The purpose of the excitation transducer 70 is to convert an ac voltage furnished by the electrical circuit via the connecting lines 44, 45 to mechanical oscillations of the oscillating rods 21 and 22. The two electrodes 53 and 57 are connected to the one pole of an ac voltage source, preferably ground, and the electrode 55 is connected to the other pole of the ac voltage source. The piezoelectric elements 54 and 56 are therefore connected in parallel electrically and in series mechanically. Due to the ac voltage applied each of the piezoelectric elements 54 and 56 undergoes a deformation (thickness change) in the axial direction of the piezo stack 50 which is proportional to the voltage applied.

The mechanical deformations of the piezoelectric elements 54 and 56 add up so that for a given magnitude of the ac voltage applied a doubling of the length change of the piezo stack 50 is achieved.

The purpose of the receiving transducer 71 is to convert the mechanical oscillations of the oscillating rods 21, 22 and the diaphragm 31 to an electrical output signal which is supplied via the connecting lines 46, 47 to the electronic circuit. The electrode 63 is connected to ground and serves to shield the receiving transducer 71. To shield the receiving transducer 71 on the other side use is made of the fact that the adjacent electrode 57 of the excitation transducer 70 is applied to ground and can thus be used at the same time as shielding electrode for the receiving transducer 71. This makes it superfluous to attach an additional shielding electrode on this side of the receiving transducer 71.

The function of the excitation and receiving transducer 4 will be explained hereinafter. Due to the prestressing, generated by the clamping screw 41 and the hexagonal nut 43 via the piezo stack 50 and the pressure studs 66, 67, the diaphragm 31 is concavely arched and as a result the oscillating rods 21 and 22 are pivoted inwardly. Thus, in contrast to the hitherto known prior art the biasing force is taken up elastically only by the diaphragm 31 and the spring action of the diaphragm 31 also compensates different thermal expansions.

When the piezo stack 50 is enlarged compared with its rest position due to the ac voltage applied to the excitation transducer 70, the pretensioned diaphragm 31 is arched concavely still further and as a result the oscillating rods 21 and 22 are pivoted further inwardly. When on the other hand in the other half period of the ac voltage the length of the piezo stack 50 is shorted with respect to its rest length, the oscillating rods 21, 22 can swing outwardly whilst the arching of the diaphragm 31 initially decreases and then, depending on the pretensioning set, can change to an arching in the opposite direction. The arching is in reality very small and may for example be of the order of magnitude of a few $\mu m$.

It will now be clear to the person skilled in the art that due to the action of the excitation transducer 70 in the piezo stack 50 the oscillating rods 21 and 22 are set in opposite oscillations transversely of their longitudinal axes in common planes containing the longitudinal axes. The illustrated structure and the dimensioning of the parts gives a large translation effect so that the deformation of the piezoelectric elements 54, 56 necessary for attaining an adequate oscillation amplitude is very small. Due to the opposite sense of the oscillations the alternating forces exerted by each oscillating rod 21, 22 on the clamping of the diaphragm 31 cancel each other out so that no vibrational energy is lost by transmission to the screw-in piece 3 and the container wall, not illustrated.

The return spring of the mechanical oscillation system formed by the oscillating rods 21, 22 and the diaphragm 31 is constituted by the diaphragm 31. The mass of the mechanical oscillation system consists firstly of the mass of the oscillating rods 21 and 22 and secondly of the mass of the surrounding medium entrained by the oscillation rods in the oscillation movement. This entrained mass is increased by the paddles 25 arranged transversely of the oscillating direction. The natural resonant frequency of the mechanical oscillation system depends firstly on the spring constant of the spring system, which may be assumed to be constant, and secondly, on the total mass, which is variable in accordance with the mass entrained. When the oscillating rods 21, 22 with their paddles 25 are disposed in air, the entrained mass of the air is negligible and a natural resonant frequency arises which is governed essentially by the mass of the oscillating rods 21, 22 and the diaphragm thickness 31. When however the oscillating rods 21, 22 with their paddles 25 are immersed in contents material, the entrained mass and thus the natural resonant frequency of the mechanical oscillation system changes. The form of the paddles 25 illustrated gives an optimum effect taking account of the restriction of the width defined by the screw-in hole in the container wall. It has been found that the increase in area achieved by further extending the paddles 25 over more than 60% of the oscillating rod length does not give any further appreciable improvement as regards the frequency change.

The excitation of the oscillations of the mechanical oscillation system always takes place with the natural resonant frequency thereof, although the latter changes. This is done in accordance with a conventional method in that the mechanical oscillation system itself serves as frequency-defining member of an electrical vibration or oscillation generator. For this purpose, the two electrodes 59 and 61 of the receiving transducer 71 are connected to the input of an amplifier, not illustrated, to the output terminals of which on the one hand the electrodes 53, 57 are connected and on the other the electrode 55 of the excitation transducer 70. The frequency of the ac voltage applied to the excitation transducer 70 therefore always follows the natural resonant frequency of the mechanical oscillation system.

It has been found that with the structure described of the oscillation system 21, 22, 31 and the excitation and receiving transducer 4, a pronounced change of the natural resonant frequency results even on very slight changes of the entrained mass. This pronounced change of the natural resonant frequency also occurs with the larger oscillation amplitude of the oscillating rods 21, 22 caused by the concave biasing of the diaphragm 31.

The means, not illustrated, controlled in dependence upon the output signal of the receiving transducer 71 for initiating display and/or switching operations is preferably so constructed that it responds to frequency changes. It is however readily also possible to design the means controlled by the output signal of the receiving transducer so that it responds to changes in the amplitude of the oscillating rods 21, 22. Irrespective of whether the frequency change or amplitude change is evaluated, a relatively small ac voltage suffices to drive the excitation transducer. It has been found that with the construction described an excitation voltage of 10 V suffices to obtain the response sensitivity. The low excitation voltage is particularly advantageous in uses in areas where there is a danger of explosions.

The low excitation voltage and the larger oscillation amplitude of the oscillating rods 21, 22 caused by the concave biasing of the diaphragm 31 also result in a low necessary stimulating power which simplifies and cheapens the configuration of the electronic circuit. Also, the response point can be set very accurately. It is for example possible to detect the transition between air and a foam or between a foam and a liquid.

I claim:

1. An apparatus for determining and/or monitoring a predetermined content level in a container, the apparatus comprising:
   a mechanical oscillation structure including a diaphragm and at least two oscillation rods which project along a longitudinal axis into the container and which are secured to the diaphragm spaced from each other;
   an excitation and receiving transducer formed by a stack of components including at least one piezoelectric element excitable by an AC voltage for stimulating the oscillation rods to opposite oscillations transverse to the longitudinal axis, at least one piezoelectric element for receiving and converting the oscillations of the mechanical oscillation structure to an electrical output signal, and a metal ring disposed on an end of the stack adjacent the diaphragm;
   at least two pressure studs disposed between the metal ring and the diaphragm;
   a clamping screw fixedly connected to a side of the diaphragm opposite from the oscillating rods, said clamping screw extending through the components of the stack; and
   means coupled to an end of the clamping screw for clamping the components of the stack against said diaphragm to provide a concave prestressing of the diaphragm.

2. The apparatus of claim 1, wherein by tightening or loosening the clamping means on the clamping screw the diaphragm is biased and set with simultaneous alignment and securing of the components of the stack.

3. The apparatus of claim 1, wherein the clamping screw is surrounded by an insulating tube providing an electrical insulation between the clamping screw and the components of the stack.

4. The apparatus of claim 1, wherein a further metal ring is disposed on the stack adjacent the clamping means.

5. The apparatus of claim 1, wherein the pressure studs are arranged at equal intervals on a circular ring having an axis of symmetry which coincides with an axis of symmetry of the diaphragm, and each pressure stud is associated with an oscillating rod so that an axis of symmetry of each pressure stud coincides with an axis of symmetry of an associated oscillating rod.

6. The apparatus of claim 1, wherein the pressure studs are formed integrally with the diaphragm.

7. The apparatus of claim 1, wherein the pressure studs are formed integrally on the metal ring.

8. An apparatus for determining and/or monitoring a predetermined content level in a container, the apparatus comprising:
   a mechanical oscillation structure including a diaphragm and at least two oscillation rods which project along a longitudinal axis into the container and which are secured to the diaphragm spaced from each other;
   an excitation and receiving transducer formed by a stack of components including a piezoelectric element excitable by an AC voltage for stimulating the oscillation rods to opposite oscillations transverse to the longitudinal axis, a piezoelectric element for receiving and converting the oscillations of the mechanical oscillation structure to an electrical output signal, and a metal ring disposed on an end of the stack facing the diaphragm;
   means for coupling the stack of components to the diaphragm; and
   at least two pressure studs disposed between the metal ring and the diaphragm so that the stack of components provides a substantially uniform force on the diaphragm.

9. The apparatus of claim 8, wherein the coupling means simultaneously biases the diaphragm and aligns and secures the components of the stack.

10. The apparatus of claim 8, wherein the coupling means is surrounded by an insulating tube providing an electrical insulation between the coupling means and the components of the stack.

11. The apparatus of claim 8, wherein the pressure studs are spaced at equal intervals relative to the metal ring.

12. The apparatus of claim 11, wherein each pressure stud is associated with an oscillating rod so that an axis of symmetry of each pressure stud coincides with an axis of symmetry of an associated oscillating rod.

13. The apparatus of claim 8, wherein the pressure studs are formed integrally with the diaphragm.

14. The apparatus of claim 8, wherein the pressure studs are formed integrally on the metal ring.

* * * * *